United States Patent
Zaifman et al.

(10) Patent No.: US 11,195,123 B2
(45) Date of Patent: Dec. 7, 2021

(54) USING SINGULAR GROUP ACTIONS IN A NETWORK TO TRAIN A MACHINE LEARNING SYSTEM

(71) Applicant: AT&T Intellectual Property I, L.P., Atlanta, GA (US)

(72) Inventors: Arthur L. Zaifman, Millburn, NJ (US); John M. Mocenigo, Califon, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 396 days.

(21) Appl. No.: 16/046,279

(22) Filed: Jul. 26, 2018

(65) Prior Publication Data

US 2020/0034748 A1    Jan. 30, 2020

(51) Int. Cl.
*G06N 20/00* (2019.01)
*G06Q 30/02* (2012.01)
*H04L 12/24* (2006.01)

(52) U.S. Cl.
CPC ......... *G06N 20/00* (2019.01); *G06Q 30/0251* (2013.01); *H04L 41/06* (2013.01)

(58) Field of Classification Search
CPC ..... G06N 20/00; G06Q 30/0251; H04L 41/06
USPC .............................................. 726/28; 706/12
See application file for complete search history.

(56) References Cited

U.S. PATENT DOCUMENTS

| | | | |
|---|---|---|---|
| 9,053,436 B2 | 6/2015 | Dalessandro et al. | |
| 9,082,084 B2 | 7/2015 | Ogilvie et al. | |
| 9,418,343 B2 | 8/2016 | Chandra et al. | |
| 10,404,738 B2 * | 9/2019 | Scherman | H04L 63/0245 |
| 10,659,300 B2 * | 5/2020 | Varjasi | H04L 41/082 |
| 10,805,861 B2 * | 10/2020 | Breaux, III | H04W 48/04 |
| 10,985,937 B2 * | 4/2021 | Nadathur | H04L 41/0816 |
| 2007/0150370 A1 * | 6/2007 | Staib | G06Q 30/0641 |
| | | | 705/26.81 |
| 2011/0029894 A1 * | 2/2011 | Eckstein | G06Q 20/32 |
| | | | 715/753 |
| 2015/0176997 A1 * | 6/2015 | Pursche | G01C 21/3492 |
| | | | 340/905 |
| 2016/0065611 A1 * | 3/2016 | Fakeri-Tabrizi | H04L 63/1441 |
| | | | 726/23 |
| 2016/0239857 A1 | 8/2016 | Milton et al. | |
| 2017/0178007 A1 | 6/2017 | Yu et al. | |
| 2017/0213156 A1 * | 7/2017 | Hammond | G06F 9/451 |
| 2017/0331910 A1 | 11/2017 | Lada et al. | |
| 2018/0034922 A1 | 2/2018 | Gopalan | |
| 2018/0089583 A1 * | 3/2018 | Iyer | G06F 3/14 |
| 2018/0129971 A1 | 5/2018 | Vlassis et al. | |
| 2018/0189407 A1 | 7/2018 | Arngren et al. | |

(Continued)

*Primary Examiner* — James D Nigh

(57) ABSTRACT

The present disclosure describes a device, computer-readable medium, and method for using singular group actions in a network to train a machine learning system. In one example, the method includes detecting a singular group action in data traversing a telecommunication service provider network, wherein the singular group action is characterized by multiple customers of the network performing a same action with their respective computing devices within a defined window of time while the multiple customers are within a threshold physical proximity to each other, labeling a subset of the data that is associated with the singular group action to generate labeled training data, and training a machine learning system using the labeled training data.

20 Claims, 3 Drawing Sheets

(56) References Cited

U.S. PATENT DOCUMENTS

| | | |
|---|---|---|
| 2018/0212837 A1 | 7/2018 | Kalluri et al. |
| 2018/0247646 A1* | 8/2018 | Meacham ............. G10L 15/063 |
| 2018/0365738 A1* | 12/2018 | Jeon ................... G06Q 30/0255 |
| 2019/0182749 A1* | 6/2019 | Breaux ................. H04W 4/027 |
| 2019/0205511 A1* | 7/2019 | Zhan ..................... G06F 21/316 |
| 2019/0327254 A1* | 10/2019 | Zaifman ............... H04L 67/125 |
| 2019/0348034 A1* | 11/2019 | Bender .............. H04N 21/4394 |
| 2020/0260287 A1* | 8/2020 | Hendel ............. H04W 12/0027 |
| 2020/0304972 A1* | 9/2020 | Gross ................ H04M 1/72522 |

* cited by examiner

USING SINGULAR GROUP ACTIONS IN A NETWORK TO TRAIN A MACHINE LEARNING SYSTEM

The present disclosure relates generally to big data, and relates more particularly to devices, non-transitory computer-readable media, and methods for shortening the machine learning cycle by discovering singular group actions in a communications network.

BACKGROUND

Machine learning is a subset of artificial intelligence in which a machine or computer "learns" to perform a task by observing a set of training data. The machine may be programmed with an algorithm that detects or recognizes patterns in the training data from which the task can be learned. The training data may be labeled (i.e., augmented with information or metadata that helps the computer to correlate the data with an outcome or event) or unlabeled (i.e., not augmented, such that the computer must attempt to correlate the data with an outcome or event unaided). Machine learning may be used in a variety of fields, include the field of telecommunications. For instance, a telecommunications service provider may utilize machine learning to identify customers or groups of customers to whom to target specific content (e.g., notifications, advertisements, or the like).

SUMMARY

The present disclosure describes a device, computer-readable medium, and method for using singular group actions in a network to train a machine learning system. In one example, the method includes detecting a singular group action in data traversing a telecommunication service provider network, wherein the singular group action is characterized by multiple customers of the network performing a same action with their respective computing devices within a defined window of time while the multiple customers are within a threshold physical proximity to each other, labeling a subset of the data that is associated with the singular group action to generate labeled training data, and training a machine learning system using the labeled training data.

In another example, a device includes a processor and a computer-readable medium storing instructions which, when executed by the processor, cause the processor to perform operations. The operations include detecting a singular group action in data traversing a telecommunication service provider network, wherein the singular group action is characterized by multiple customers of the network performing a same action with their respective computing devices within a defined window of time while the multiple customers are within a threshold physical proximity to each other, labeling a subset of the data that is associated with the singular group action to generate labeled training data, and training a machine learning system using the labeled training data.

In another example, a non-transitory computer-readable storage medium stores instructions which, when executed by a processor, cause the processor to perform operations. The operations include detecting a singular group action in data traversing a telecommunication service provider network, wherein the singular group action is characterized by multiple customers of the network performing a same action with their respective computing devices within a defined window of time while the multiple customers are within a threshold physical proximity to each other, labeling a subset of the data that is associated with the singular group action to generate labeled training data, and training a machine learning system using the labeled training data.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure uses singular group actions in a network to train a machine learning system. As discussed above, a telecommunications service provider may utilize machine learning to identify customers or groups of customers to whom to target specific content (e.g., notifications, advertisements, or the like). However, given the tremendous volume of data that is continually being generated in a communications network, it is practically infeasible to try to label the data (e.g., as positive or negative examples) to train a machine learning system.

Examples of the present disclosure leverage the occurrence of singular group actions, or "herd" events, in which multiple network customers who are located in close physical proximity to each other perform the same action on their connected devices at the same time. These events may be unintentional or incidental in the sense that the multiple network customers may not be consciously acting in a coordinated manner. For instance, a group of passengers on an airplane may turn off "airplane mode" on their mobile devices when their airplane lands, after a period of airplane mode being turned on. As a result, the domain name server (DNS) resolver caches of the mobile devices will all clear at roughly the same time. This creates an event that can be detected by a telecommunications service provider, due to the number of devices in close physical proximity performing the same action at the same time. Specifically, the telecommunications service provider can subsequently see a burst of DNS activity generated by the various applications installed on the mobile devices. The telecommunications service provider may label the data generated by this activity accordingly (e.g., as positive examples) for the purposes of training a machine learning system.

Figure 1:
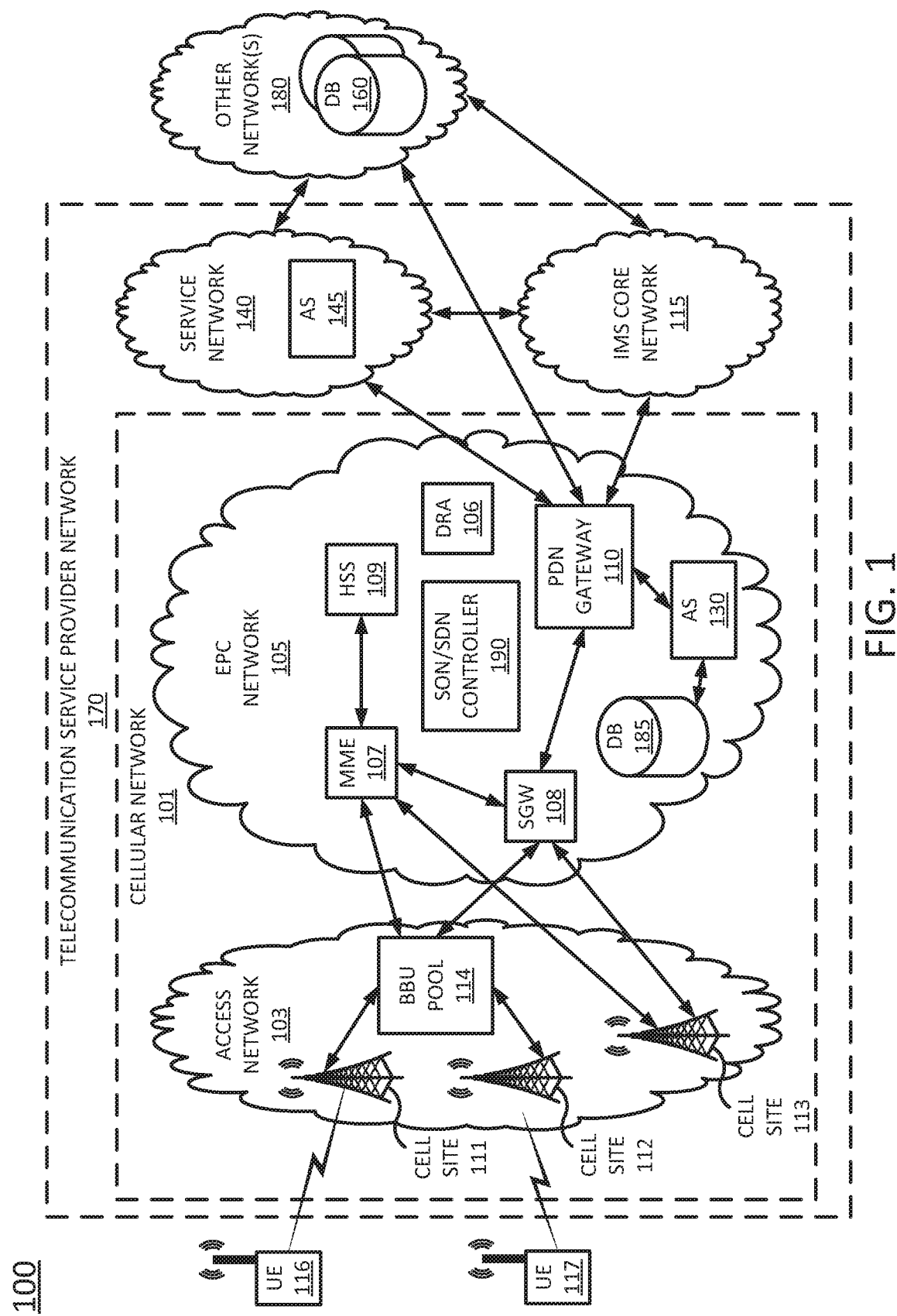
FIG. 1 illustrates an example network, or system, in which examples of the present disclosure for using singular group actions in a network to train a machine learning system may operate.

To better understand the present disclosure, FIG. 1 illustrates an example network, or system 100, in which examples of the present disclosure for using singular group actions in a network to train a machine learning system may operate. In one example, the system 100 includes a telecommunication service provider network 170. The telecommunication service provider network 170 may comprise a cellular network 101 (e.g., a 4G/Long Term Evolution (LTE)

network, a 4G/5G hybrid network, or the like), a service network 140, and a core network, e.g., an IP Multimedia Subsystem (IMS) core network 115. The system 100 may further include other networks 180 connected to the telecommunication service provider network 105. FIG. 1 also illustrates various endpoint devices 116 and 117, e.g., user equipment or user endpoints (UE). The endpoint devices UE 116 and 117 may each comprise mobile endpoint devices such as a cellular telephone, a smartphone, a tablet computing device, a laptop computer, a pair of computing glasses, a wireless enabled wristwatch, a connected car, or any other cellular-capable mobile telephony and computing devices (broadly, "mobile endpoint devices"). Non-mobile wireless enabled endpoint devices, such as desktop computers, smart televisions, set top boxes, gaming consoles, intelligent personal assistants, or connected home devices (e.g., Wi-Fi enabled thermostats, lighting systems, security systems, or the like), may also be connected to the telecommunication service provider network 170. In one example, UEs 116 and 117 may comprise all or a portion of a computing device or system. The UEs 116 and 117 may be associated with a subscription service provided over the telecommunication service provider network 170, such as cellular phones services or other services.

In one example, the cellular network 101 may comprise an access network 103 and a core network, Evolved Packet Core (EPC) network 105. In one example, the access network 103 comprises a cloud RAN. For instance, a cloud RAN is part of the $3^{rd}$ Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may, in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, all cell sites in the access network 103 are in communication with the EPC network 105 via baseband units in BBU pool 114. In operation, mobile endpoint device UE 116 may access wireless services via the cell site 111 and mobile endpoint device UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG: 1.

In one example, service network 140 may comprise one or more devices, such as application server (AS) 145 for providing services to subscribers, customers, and or users. For example, telecommunication service provider network 170 may provide a cloud storage service, web server hosting, social media applications, and other services. As such, service network 140 may represent aspects of telecommunication service provider network 170 where infrastructure for supporting such services may be deployed. Although a single application server, AS 145, is illustrated in service network 140, it should be understood that service network 140 may include any number of components to support one or more services that may be provided to one or more subscribers, customers, or users by the telecommunication service provider network 170.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 190. In one example, SON/SDN controller 190 may function as a self-optimizing network (SON) orchestrator that is responsible for activating and deactivating, allocating and deallocating, and otherwise managing a variety of network components. For instance, SON/SDN controller 190 may activate and deactivate antennas/remote radio heads of cell sites 111 and 112, respectively, may allocate and deactivate baseband units in BBU pool 114, and may perform other operations for activating antennas based upon a location and a movement of a group of mobile endpoint devices, in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which maybe physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

In accordance with the present disclosure, SON/SDN controller 190 may therefore control various components within EPC network 105 and/or within access network 103 to support the traffic that is accommodated by the activation of antennas/remote radio heads of cell sites 111 and 112, respectively and the allocation of baseband units in BBU pool 114. For instance, SON/SDN controller 190 (e.g., performing functions of a SON orchestrator) may activate an antenna of cell site 111 and assign a baseband unit in BBU pool 114 when a group of mobile endpoint devices is detected near the cell site 111. SON/SDN controller 190 (e.g., performing functions of a SDN controller) may further instantiate VNFs to function as routers, switches, gateways, and the like to ensure that sufficient backhaul resources are available for the traffic to transit the access network 103 and/or EPC network 105. In addition, as mentioned above, any one or more of the DRA 106, MME 107, SGW 108, HSS 109, and PGW 110 may comprise VNFs instantiated on host devices. As such, SON/SDN controller 190 may perform similar operations to instantiate, configure, reconfigure, and decommission such components in support of examples of the present disclosure for activating antennas based upon a location and a movement of a group of mobile endpoint devices.

The SON/SDN controller 190 may be connected directly or indirectly to any one or more network elements of EPC network 105, and of the system 100 in general. Due to the relatively large number of connections available between SON/SDN controller 190 and other network elements, none of the actual links to the application server are shown in FIG. 1. Similarly, intermediate devices and links between DRA 106, MME 107, SGW 108, eNodeBs 111 and 112, PDN gateway 110, and other components of system 100 are also omitted for clarity, such as additional routers, switches, gateways, and the like.

As further illustrated in FIG. 1, EPC network 105 may further include an application server (AS) 130, which may comprise all or a portion of a computing device or system, such as computing system 300, and/or processing system 302 as described in connection with FIG. 3 below, and may be configured to perform various operations in connection with using singular group actions in a network to train a machine learning system, and for performing various other operations in accordance with the present disclosure. For instance, AS 130 may host one or more machine learning applications that are configured to target content, such as notifications, news, emergency alerts, advertisements, or other information, to subscribers to whom the content is believed to be relevant. In this regard, AS 130 may maintain communications with BBU pool 114, cell sites 111-113, and so forth, via PDN gateway 110 and SGW 108, for example. One of these sources may comprise a database (DB) 185 in the EPC network 105, which may store data (e.g., packets, flow, and the like) that are labeled by the AS 130 for use as training data by a machine learning system. Other sources may include one or more databases (DBs) 160 residing in other networks 180. To this end, the AS 103 may expose application programming interfaces (APIs) and grammars for these other databases 160 to quickly plug in and report data.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, SON/SDN controller 190 may be spilt into separate components to operate as a SON orchestrator and a SDN controller, respectively. Similarly, although the SON/SDN controller 190 is illustrated as a component of EPC network 105, in another example SON/SDN controller 190, and/or other network components may be deployed in an IMS core network 115 instead of being deployed within the EPC network 105, or in other portions of system 100 that are not shown, while providing essentially the same functionality.

Similarly, functions described herein with respect to AS 130 may alternatively or additionally be provided by AS 145.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., a 2G network, a 3G network, a 5G network, an integrated network, e.g., including any two or more of 2G-5G infrastructure and technologies, and the like), that are suitable for use in connection with examples of the present disclosure for forecasting network traffic for events. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 130 of FIG. 1 may represent an application function (AF) for forecasting network traffic for events in accordance with various examples of the present disclosure. In addition, any one or more of cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
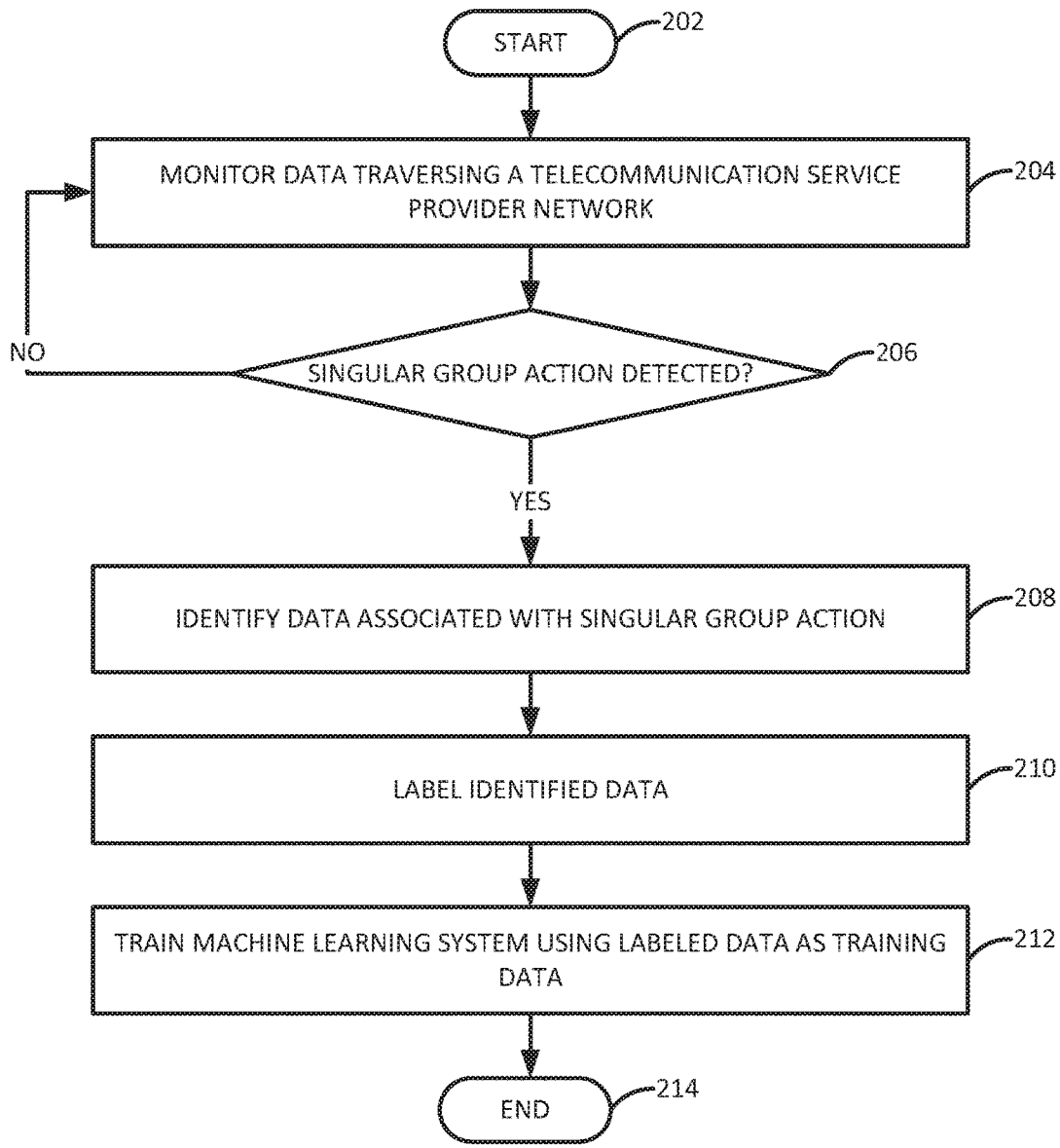
FIG. 2 illustrates a flowchart of an example method for using singular group actions in a network to train a machine learning system.

To further aid in understanding the present disclosure, FIG. 2 illustrates a flowchart of an example method 200 for using singular group actions in a network to train a machine learning system. In one example, the method 200 may be performed by an application server, e.g., AS 130 illustrated in FIG. 1. However, in other examples, the method 200 may be performed by another device. For instance, another application server such as AS 145 could also perform all or some steps of the method 200. As such, any references in the discussion of the method 200 to the AS 130 of FIG. 1 are not intended to limit the means by which the method 200 may be performed.

The method 200 begins in step 202. In step 204, data traversing a telecommunication service provider network (e.g., such as the network 170 of FIG. 1) is monitored. In one example, the monitoring involves looking for singular group actions or herd events in flows or packets. As discussed above, a herd event is an event in which multiple network customers who are located in close physical proximity to each other perform the same action on their connected devices at the same time. Thus, herd events are defined by proximity in both location and time.

In one example, the physical proximity may be defined by some threshold level of closeness. For instance, a threshold physical proximity for determining a herd event could be a radius of x miles from a defined point (e.g., a set of geographic coordinates), where a connected device must perform the herd action while within the radius to be considered part of the herd. In another example, the threshold physical proximity could be a presence within a specific venue (e.g., an airport, a sports stadium, a public park, or the like), where a connected device must perform the herd action while at the venue to be considered part of the herd.

Moreover, the "same time" may be defined as occurring within some defined window of time (e.g., all actions occurring within the same y-second window, actions occurring within z seconds of the first observed occurrence of the action, etc.). Thus, a connected device must perform the herd action within the defined window of time to be considered part of the herd.

For instance, in one example, the herd event is multiple network customers at the same venue turning "airplane mode" off on their mobile devices within a window of one minute. This might occur, for example, when an airplane lands at an airport, when a movie ends in a movie theater, or when a live performance in a theater reaches intermission or ends. Turning off airplane mode after a period of airplane mode being turned on will cause the DNS resolver caches of the mobile devices to clear, which in turn will cause detectable activity in the telecommunication service provider network. Specifically, the telecommunication service provider network may be able to see all of the DNS activity generated by the various applications installed on these mobile devices once airplane mode is turned off.

In another example, the herd event might be multiple network customers at the same venue launching the same application on their mobile devices within a window of five minutes. For instance, when a football game ends, multiple customers who are present at the stadium may launch a navigation application and/or a traffic monitoring application in order to calculate the quickest route home from the game. The telecommunication server provider network may be able to see when servers associated with the navigation application and/or a traffic monitoring application suddenly receive a burst of traffic originating from the stadium.

In step 206, it is determined whether a singular group action (e.g., such as those described above) has been detected. In one example, a singular group action may be verified or confirmed by correlating data indicative of a singular group action with data in third-party data sources or databases (e.g., databases 160 of FIG. 1). For instance, if multiple network customers at an airport are detected turning "airplane mode" off on their mobile devices within a window of one minute, the window may be compared to airline flight schedules to verify whether a flight is expected to have landed at the airport within a predefined period of time including that window.

If it is determined in step 206 that a singular group action has not been detected, then the method 200 returns to step 204, and monitoring of the data continues as described above.

If, however, it is determined in step 206 that a singular group action has been detected, then the method 200 proceeds to step 208. In step 208, data associated with the singular group action is identified. The identified data may comprise, for example, flows or individual packets exchanged by a device that is part of the herd and a server or another device in the telecommunication service provider network.

In step 210, the data identified in step 208 is labeled, e.g., as a positive training example for training a machine learning system. For instance, a flow or a packet may be annotated, or a value may be set in a field of a header or footer, to indicate that the flow or the packet comprises a positive training example.

In step 212, a machine learning system is trained, using the labeled data generated in step 210 as training data. For instance, the machine learning system may use the labeled data to train a model that may later be used to perform a task (where the task may involve evaluating new data generated in the telecommunication service provider network). For instance, the task may comprise targeting content to customers of the telecommunication service provider network (i.e., identifying specific content and sending or recommending the specific content to specific customers, based on the specific content being deemed to be relevant to the specific customers).

The method 200 ends in step 214.

As discussed above, once the labeled training data has been provided to a machine learning system, the labeled training data may assist the machine learning system in learning how to perform a task, such as targeting content to customers or devices in a telecommunication service provider network. For instance, when the machine learning system detects that multiple mobile devices at an airport have turned airplane mode off at the same time, the machine learning system may assume that an airplane has just landed at the airport. Consequently, the machine learning system may recommend that content related to services located in the vicinity of the airport (e.g., advertisements, coupons, and/or schedules for local hotels, restaurants, events, or places of interest) be pushed to those mobile devices. The content pushed to the devices could also be of a non-commercial nature (e.g., weather forecasts, local news, traffic updates, etc.).

In further examples, the machine learning system may be able to learn demographic information from training data that has been labeled in the manner described above. For instance, if the herd event involves multiple users in physical proximity to each other launching the same application at the same time, demographic information may be learned by examining the specific applications that were launched (e.g., younger customers may be more likely than older customers to launch social media applications, or customers who do not live in the location at which the herd event occurred may be more likely to launch ride sharing applications). This demographic information could be used to further refine the targeting of content. For instance, the machine learning system might learn to distinguish between airplane passengers who are visiting from out of town and airplane passengers who are returning home (and therefore only send content for local hotels to visitors).

Examples of the present disclosure therefore shorten the machine learning cycle by providing an efficient and feasible way of labeling positive training examples culled from a large volume of data traversing a telecommunication service provider network. The disclosed approach learns from and leverages mobile device events that are typically unintentional or incidental (in the sense that the network customers operating the mobile devices may not be consciously acting in a coordinated manner).

Figure 3:
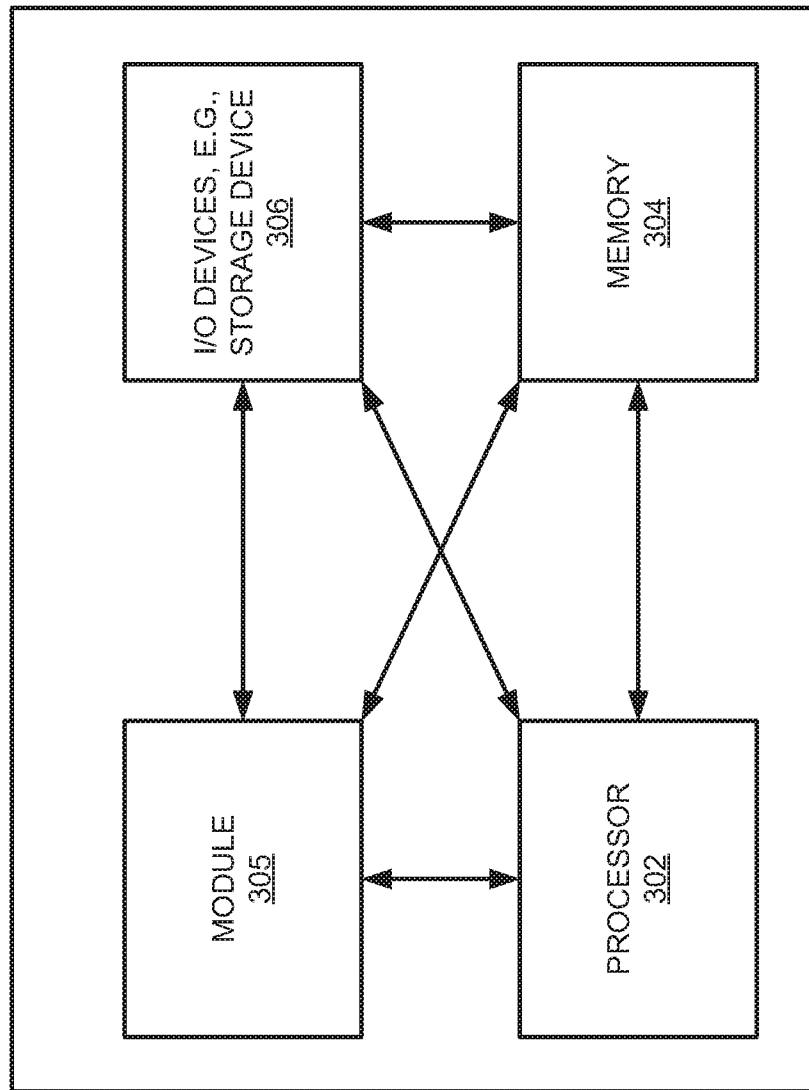
FIG. 3 depicts a high-level block diagram of a computing device specifically programmed to perform the functions described herein.

FIG. 3 depicts a high-level block diagram of a computing device 300 specifically programmed to perform the functions described herein. For example, any one or more components or devices illustrated in FIG. 1 or described in connection with the method 200 may be implemented as the system 300. For instance, an application server could be implemented as illustrated in FIG. 3.

As depicted in FIG. 3, the system 300 comprises a hardware processor element 302, a memory 304, a module 405 for using singular group actions in a network to train a machine learning system, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for using singular group actions in a network to train a machine learning system may include circuitry and/or logic for performing special purpose functions relating to building, testing, and/or modifying customized messages. The input/output devices 306 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a neurotransmitter, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s)

discussed above can be used to configure a hardware processor to perform the steps, functions and/or operations of the above disclosed method(s). In one example, instructions and data for the present module or process 305 for using singular group actions in a network to train a machine learning system (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for using singular group actions in a network to train a machine learning system (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method, comprising:
   detecting, by a processor, a singular group action in data traversing a telecommunication service provider network, wherein the singular group action is characterized by multiple customers of the telecommunication service provider network acting in an unintentionally coordinated manner by performing a same action with their respective computing devices within a defined window of time while the multiple customers are within a threshold physical proximity to each other;
   labeling, by the processor, a subset of the data that is associated with the singular group action to generate labeled training data; and
   training, by the processor, a machine learning system using the labeled training data.

2. The method of claim 1, wherein the same action is turning an airplane mode off.

3. The method of claim 2, wherein the subset of the data comprises a burst of domain name server activity by applications installed on the respective computing devices after the airplane mode is turned off.

4. The method of claim 1, wherein the same action comprises launching a same application.

5. The method of claim 4, wherein the subset of the data comprises a burst of traffic originating within the threshold physical proximity and terminating at a server associated with the same application.

6. The method of claim 1, wherein the threshold physical proximity defines a radius distance from a defined point.

7. The method of claim 6, wherein the defined point is defined by a set of geographic coordinates.

8. The method of claim 1, wherein the threshold physical proximity defines a specific venue.

9. The method of claim 1, wherein the detecting comprises correlating the subset of the data with a third-party data source.

10. The method of claim 1, wherein the labeling comprises labeling the subset of the data as a positive training example.

11. The method of claim 1, wherein the machine learning system comprises a model that is tasked with targeting content to customers of the telecommunication service provider network.

12. A device, comprising:
    a processor; and
    a computer-readable medium storing instructions which, when executed by the processor, cause the processor to perform operations, the operations comprising:
       detecting a singular group action in data traversing a telecommunication service provider network, wherein the singular group action is characterized by multiple customers of the telecommunication service provider network acting in an unintentionally coordinated manner by performing a same action with their respective computing devices within a defined window of time while the multiple customers are within a threshold physical proximity to each other;
       labeling data associated with the singular group action to generate labeled training data; and
       training a machine learning system using the labeled training data.

13. A non-transitory computer-readable storage medium storing instructions which, when executed by a processor, cause the processor to perform operations, the operations comprising:
    detecting a singular group action in data traversing a telecommunication service provider network, wherein the singular group action is characterized by multiple customers of the telecommunication service provider network acting in an unintentionally coordinated manner by performing a same action with their respective computing devices within a defined window of time while the multiple customers are within a threshold physical proximity to each other;
    labeling data associated with the singular group action to generate labeled training data; and
    training a machine learning system using the labeled training data.

14. The non-transitory computer-readable storage medium of claim 13, wherein the same action is turning an airplane mode off.

15. The non-transitory computer-readable storage medium of claim 14, wherein the subset of the data comprises a burst of domain name server activity by applications installed on the respective computing devices after the airplane mode is turned off.

16. The non-transitory computer-readable storage medium of claim 13, wherein the same action comprises launching a same application.

17. The non-transitory computer-readable storage medium of claim 16, wherein the subset of the data comprises a burst of traffic originating within the threshold physical proximity and terminating at a server associated with the same application.

18. The non-transitory computer-readable storage medium of claim 13, wherein the detecting comprises correlating the subset of the data with a third-party data source.

19. The non-transitory computer-readable storage medium of claim 13, wherein the labeling comprises labeling the subset of the data as a positive training example.

20. The non-transitory computer-readable storage medium of claim 13, wherein the machine learning system comprises a model that is tasked with targeting content to customers of the telecommunication service provider network.

\* \* \* \* \*